(12) United States Patent
Wu et al.

(10) Patent No.: US 8,861,372 B2
(45) Date of Patent: Oct. 14, 2014

(54) METHOD AND DEVICE FOR FAST PUSHING UNICAST STREAM IN FAST CHANNEL CHANGE

(75) Inventors: Xingfen Wu, Nanjing (CN); Tianchang Yu, Shenzhen (CN); Zhiping Huang, Shenzhen (CN); Hewen Zheng, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 13/331,579

(22) Filed: Dec. 20, 2011

(65) Prior Publication Data

US 2012/0155280 A1 Jun. 21, 2012

(30) Foreign Application Priority Data

Dec. 20, 2010 (CN) .......................... 2010 1 0602783

(51) Int. Cl.
*H04N 21/236* (2011.01)
*H04L 29/06* (2006.01)
*H04N 21/438* (2011.01)
*H04N 21/6405* (2011.01)

(52) U.S. Cl.
CPC ........ *H04N 21/4384* (2013.01); *H04L 65/4084* (2013.01); *H04L 65/80* (2013.01); *H04L 65/4076* (2013.01); *H04N 21/6405* (2013.01); *H04L 65/608* (2013.01)
USPC ........... 370/241; 370/486; 370/432; 370/429; 370/428

(58) Field of Classification Search
USPC ....................................................... 370/241
See application file for complete search history.

(56) References Cited

U.S. PATENT DOCUMENTS

| | | | | |
|---|---|---|---|---|
| 7,430,222 B2* | 9/2008 | Green et al. | ................... | 370/486 |
| 7,562,375 B2* | 7/2009 | Barrett et al. | ................... | 725/38 |
| 7,830,908 B2* | 11/2010 | Akgul et al. | ................... | 370/464 |
| 8,108,893 B2* | 1/2012 | Haberman et al. | ............... | 725/34 |

(Continued)

FOREIGN PATENT DOCUMENTS

| | | |
|---|---|---|
| CN | 101212328 A | 7/2008 |
| CN | 101212406 A | 7/2008 |
| WO | WO 2008110122 A1 | 9/2008 |

OTHER PUBLICATIONS

Office Action issued in corresponding Japanese Patent Application No. 2011-277873, mailed Mar. 19, 2013.
Begen et al., "On the Use of RTP for Monitoring and Fault Isolation in IPTV" IEEE Network, Mar./Apr. 2010.

(Continued)

*Primary Examiner* — Ian N Moore
*Assistant Examiner* — Lakeram Jangbahadur
(74) *Attorney, Agent, or Firm* — Brinks Gilson & Lione

(57) ABSTRACT

The present invention discloses a method and a device for fast pushing a unicast stream in a Fast Channel Change (FCC), and relates to the field of Internet Protocol Television (IPTV). A server obtains a multicast join delay of a terminal, determines a minimum value of a data amount between a starting position of a fast unicast stream and a latest packet position according to the multicast join delay of the terminal, a decoding rate, a unicast push rate, and a lowest buffer data amount required for decoding, judges whether a latest I frame completely arrives according to a packet buffer state; and fast pushes the unicast stream starting from the latest I frame if the latest I frame completely arrives, and an arrived data amount starting from the latest I frame is greater than or equal to the minimum value.

16 Claims, 4 Drawing Sheets

(56) References Cited

U.S. PATENT DOCUMENTS

| | | | |
|---|---|---|---|
| 8,301,982 B2* | 10/2012 | Ver Steeg et al. | 714/776 |
| 8,424,036 B2* | 4/2013 | Haberman et al. | 725/34 |
| 2005/0190781 A1 | 9/2005 | Green et al. | |
| 2007/0192812 A1* | 8/2007 | Pickens et al. | 725/94 |
| 2009/0064242 A1* | 3/2009 | Cohen et al. | 725/90 |
| 2010/0043022 A1* | 2/2010 | Kaftan | 725/34 |
| 2010/0083328 A1* | 4/2010 | Kisel et al. | 725/109 |
| 2010/0111197 A1* | 5/2010 | Jiang et al. | 375/240.26 |
| 2010/0115566 A1* | 5/2010 | Haimi-Cohen | 725/94 |
| 2010/0125883 A1* | 5/2010 | Mukherjee et al. | 725/92 |
| 2012/0036277 A1* | 2/2012 | Stokking et al. | 709/231 |
| 2012/0036545 A1* | 2/2012 | Cai et al. | 725/109 |
| 2012/0099588 A1* | 4/2012 | Liu et al. | 370/389 |

OTHER PUBLICATIONS

Office Action issued in corresponding Chinese Patent Application No. 201010602783.2, mailed Apr. 27, 2012.

Chinese Patent No. 102137275, issued on Dec. 19, 2012, granted in corresponding Chinese Patent Application No. 201010602783.2.

Extended European Search Report dated (mailed) Feb. 10, 2012, issued in related Application No. 11191244.0-2223, Hauwei Technologies Co., Ltd.

A. Begen, "Rapid Multicast Synchronization Report Block Type for RTCP XR draft-begen-avt-rapid-sync-rtcp-xr-00," Cisco Systems, Mar. 3, 2009.

B. VerSteeg et al., "Unicast-Based Rapid Acquisition of Multicast RTP Sessions draft-ietf-avt-rapid-acquisition-for-rtp-17," Nov. 18, 2010.

* cited by examiner

METHOD AND DEVICE FOR FAST PUSHING UNICAST STREAM IN FAST CHANNEL CHANGE

CROSS-REFERENCE TO RELATED APPLICATIONS

This application claims priority to Chinese Patent Application No. 201010602783.2, filed with the Chinese Patent Office on Dec. 20, 2010, which is hereby incorporated by reference in its entirety.

FIELD OF THE INVENTION

The present invention relates to the field of Internet Protocol Television (IPTV) Fast Channel Change (FCC), and in particular, to a method and a device for fast pushing a unicast stream in an FCC.

BACKGROUND OF THE INVENTION

Compared with conventional digital television, IPTV has a disadvantage that channel change time is long. An FCC method may shorten a channel change delay.

During a process of the FCC, after receiving an FCC request sent by a Set Top Box (STB), a server fast pushes a unicast stream starting from a previous I frame (intra picture) of a latest I frame.

In the prior art, the unicast stream is fast pushed starting from the previous I frame of the latest I frame, burst traffic is large, and a bandwidth requirement is increased; further, the STB performs decoding starting from the previous I frame of the latest I frame, so that image content is earlier than latest channel content, that is, compared with the latest channel content, the content after the FCC is delayed. It is necessary to synchronize channel content played by the STB with the latest channel content from the previous I frame of the latest I frame, which increases synchronization processing time.

SUMMARY OF THE INVENTION

In order to reduce burst traffic and synchronization processing time of channel content, embodiments of the present invention provide a method and a device for fast pushing a unicast stream in an FCC. Technical solutions are as follows:

According to one aspect of the present invention, a method for fast pushing a unicast stream in an FCC includes:
  obtaining a multicast join delay of a terminal;
  determining a minimum value of a data amount between a starting position of a fast unicast stream and a latest packet position according to the multicast join delay of the terminal, a decoding rate, a unicast push rate, and a lowest buffer data amount required for decoding;
  judging whether a latest I frame completely arrives according to a packet buffer state; and
  fast pushing the unicast stream starting from the latest I frame if the latest I frame completely arrives, and an arrived data amount starting from the latest I frame is greater than or equal to the minimum value.

According to another aspect of the present invention, a device for fast pushing a unicast stream in an FCC includes:
  an obtaining module, configured to obtain a multicast join delay of a terminal;
  a determining module, configured to determine a minimum value of a data amount between a starting position of a fast unicast stream and a latest packet position according to the multicast join delay of the terminal, a decoding rate, a unicast push rate, and a lowest buffer data amount required for decoding;
  a judging module, configured to judge whether a latest I frame completely arrives according to a packet buffer state; and
  a pushing module, configured to fast push the unicast stream starting from the latest I frame if the latest I frame completely arrives, and an arrived data amount starting from the latest I frame is greater than or equal to the minimum value.

Beneficial effects brought by the technical solutions provided in the embodiments of the present invention are:
The minimum value of the data amount between the starting position of the fast unicast stream and the latest packet position is determined according to the multicast join delay of the terminal, the decoding rate, the unicast push rate, and the lowest buffer data amount required for decoding; the unicast stream is fast pushed starting from the latest I frame if the latest I frame completely arrives, and the arrived data amount from the latest I frame is greater than or equal to the minimum value. Compared with fixedly fast pushing the unicast stream from the previous I frame of the latest I frame, the burst traffic is reduced, and meanwhile it is ensured that the terminal buffer is prevented from underflow due to a long multicast join delay, thus reducing a bandwidth requirement and the synchronization processing time for the channel content while ensuring quality of images played by the terminal.

BRIEF DESCRIPTION OF THE DRAWINGS

To illustrate the technical solutions according to the embodiments of the present invention more clearly, accompanying drawings required for describing the embodiments or the prior art are introduced briefly in the following. Apparently, the accompanying drawings in the following description are only some embodiments of the present invention; persons of ordinary skill in the art may further obtain other drawings according to the accompanying drawings without creative efforts.

DETAILED DESCRIPTION OF THE EMBODIMENTS

In order to make the objectives, technical solutions, and advantages of the present invention more comprehensible, a detailed description of the present invention is given below with reference to the accompanying drawings.

Embodiment 1

Figure 1:
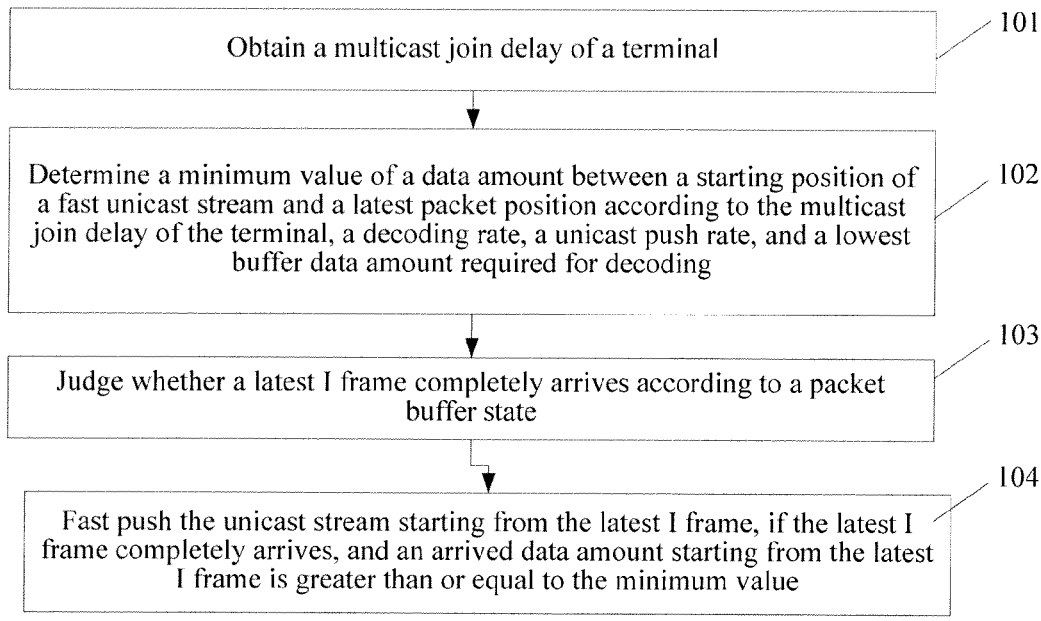
FIG. 1 is a flow chart of a method for fast pushing a unicast stream in an FCC according to a first embodiment of the present invention.

Referring to FIG. 1, this embodiment provides a method for fast pushing a unicast stream in an FCC. The method includes:

101: Obtain a multicast join delay of a terminal.

The terminal may be mobile terminals such as an STB, a personal computer, a television, or a mobile phone, a tablet computer, which is not limited in this embodiment.

102: Determine a minimum value of a data amount between a starting position of a fast unicast stream and a latest packet position according to the multicast join delay of the terminal, a decoding rate, a unicast push rate, and a lowest buffer data amount required for decoding.

The minimum value of the data amount between the starting position of the fast unicast stream and the latest packet position is used to ensure that a data amount of a buffer of the terminal is still greater than the lowest buffer data amount required for decoding after the multicast join delay. The lowest buffer data amount required for decoding may be zero.

103: Judge whether a latest I frame completely arrives according to a packet buffer state.

104: Fast push the unicast stream starting from the latest I frame if the latest I frame completely arrives, and an arrived data amount starting from the latest I frame is greater than or equal to the minimum value.

During the process of the FCC, after receiving an FCC request sent by the terminal, a server fast pushes the unicast stream. The so-called fast pushing the unicast stream refers to that a rate of pushing the unicast stream is rate greater than an original rate, for example, is 1.3 times of the original rate. The terminal receives the unicast stream and decodes the unicast stream, and a decoding rate is basically equivalent to the original rate. When finding that the unicast stream catches a multicast stream, the server starts to slowly push the unicast stream, and sends a multicast packet synchronizing message to the terminal. The so-called slowly pushing the unicast stream refers to that the rate of pushing the unicast stream is smaller than the original rate, for example, is 0.3 times of the original rate. The reason that the server slowly pushes the unicast stream is to reserve an enough bandwidth for the multicast stream to be received by the terminal, so that the rate of slowly pushing the unicast stream is usually the rate of fast pushing the unicast stream minus the original rate. Certainly, another rate and manner, for example, continuing to fast push the unicast stream, are also acceptable. After receiving the multicast packet synchronizing message, the terminal sends an Internet Group Management Protocol (IGMP) Join message to a multicast replication point to request to join the multicast, and prepares for receiving the multicast stream. Because the decoding rate is greater than the rate of slowly pushing the unicast stream, when the terminal decodes and plays images, data in the buffer is continuously consumed. If the delay between time for sending the IGMP Join message (when starting to slowly push the unicast stream, the server sends the multicast packet synchronizing message, so the time for sending the IGMP Join message by the terminal is also time for starting to receive the slowly pushed unicast stream by the terminal) and time for receiving the multicast stream by the terminal, that is, the multicast join delay is long, the data amount in the buffer may underflow, that is, the data amount may be reduced to be below a threshold value or even cleared, so that a decoder does not have enough data for decoding, which results in a pause or blurred screen phenomenon of the played images.

In this embodiment, the minimum value of the data amount between the starting position of the fast unicast stream and the latest packet position is determined according to the multicast join delay of the terminal, the decoding rate, the unicast push rate, and the lowest buffer data amount required for decoding; the unicast stream is fast pushed starting from the latest I frame if the latest frame completely arrives, and the arrived data amount starting from the latest I frame is greater than or equal to the minimum value. Compared with fixedly fast pushing the unicast stream from a previous I frame of the latest I frame, burst traffic is reduced, and meanwhile it is ensured that the terminal buffer is prevented from underflow due to a long multicast join delay, thus reducing a bandwidth requirement and synchronization processing time for channel content while ensuring quality of images played by the terminal.

Embodiment 2

Figure 2:
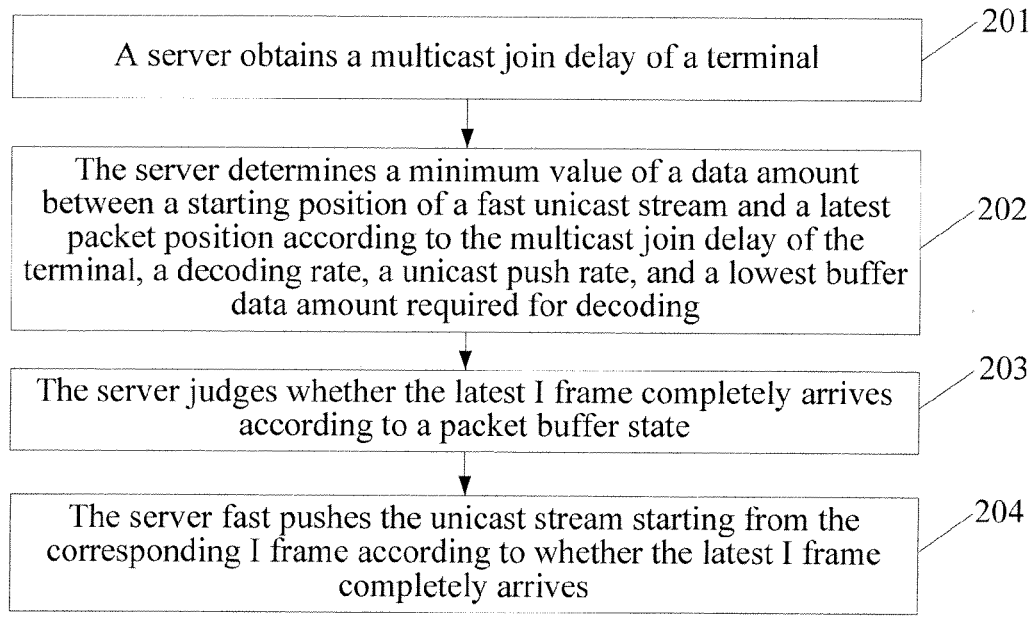
FIG. 2 is a flow chart of a method for fast pushing a unicast stream in an FCC according to a second embodiment of the present invention.

This embodiment is an improvement on the basis of a first embodiment. Referring to FIG. 2, a method for fast pushing a unicast stream in an FCC includes:

201: A server obtains a multicast join delay of a terminal.

Specifically, an RTCP XR extension message sent by the terminal is received, where the RTCP XR extension message carries relevant information of the multicast join delay of the terminal. The relevant information of the multicast join delay may be a multicast join delay, or may be time for sending a multicast join message by the terminal and time for receiving a First Multicast Packet (FMP) by the terminal; the multicast join delay is calculated and obtained according to the time for sending the multicast join message by the terminal and the time for receiving the FMP by the terminal, that is, a time interval between the time for sending the multicast join message by the terminal and the time for receiving the FMP by the terminal is the multicast join delay. The multicast join delay of the terminal is obtained by the terminal according to history data.

Figure 3:
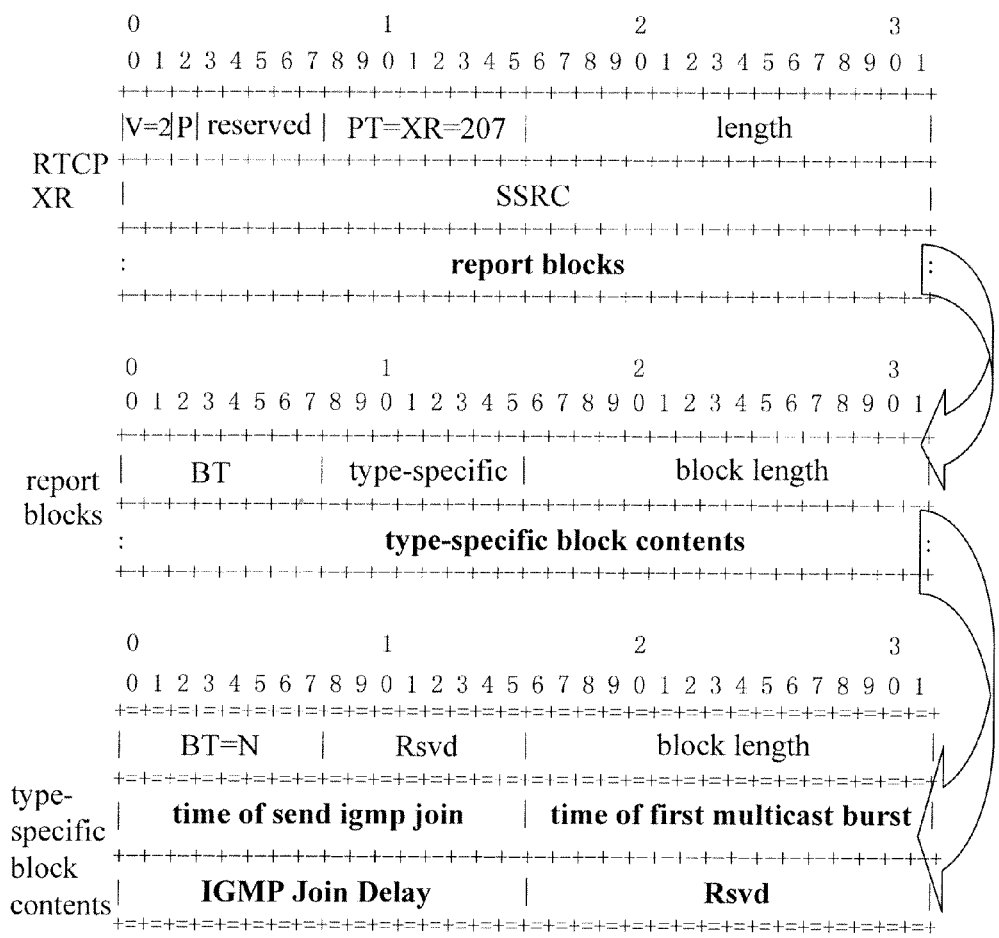
FIG. 3 is a schematic diagram of a Real-time Transport Control Protocol (RTCP) Extended Report (XR) extension message according to a second embodiment of the present invention.

FIG. 3 shows an example of the RTCP XR extension message, where an extended field includes: an IGMP Join Delay, that is, the multicast join delay; or extended fields include: time of send igmp join and time of first multicast burst, that is, the time for sending the multicast join message by the terminal and the time for receiving the FMP by the terminal. Alternatively, extended fields may also include the foregoing three extended fields.

202: The server determines a minimum value of a data amount between a starting position of a fast unicast stream and a latest packet position according to the multicast join delay of the terminal, a decoding rate, a unicast push rate, and a lowest buffer data amount required for decoding.

Specifically, according to $Vi_{(min)} = (nX - sX) \times T3 + cB$, the minimum value $Vi_{(min)}$ of the data amount between the starting position of the fast unicast stream and the latest packet position is determined.

$Vi_{(min)}$ is the minimum value of the data amount between the starting position of the fast unicast stream and the latest packet position, nX is the decoding rate, X is a video average rate, n is a decoding multiplying power, sX is the unicast push rate, and s is a pushing multiplying power. Specifically, under the situation that the server slowly pushes the unicast stream when the unicast stream catches a multicast stream, s is a slowly pushing multiplying power (set to be b), that is, b<1. Specifically, under the situation that when the unicast stream catches the multicast stream, the server still fast pushes the unicast until a multicast replication point sends a multicast stream, s is a fast pushing multiplying power (set to be a), that is, a>1. T3 is the multicast join delay of the terminal, cB is the lowest buffer data amount required for decoding of the terminal, c is a buffer coefficient, and B is a maximum data amount that a Video Buffering Verifier (VBV) can buffer.

Figure 4:
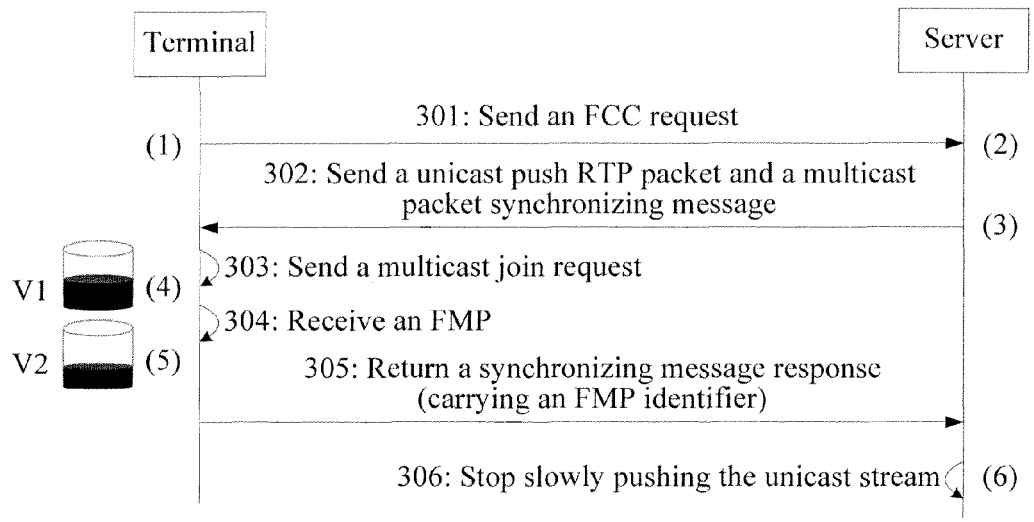
FIG. 4 is a diagram of an information interaction of an FCC according to a second embodiment of the present invention.

FIG. 4 is a diagram of an information interaction of an FCC, where the information interaction includes:

301: A terminal sends an FCC request to a server at a time point 1.

302: The server receives the FCC request at a time point 2, and starts to fast push a unicast stream to the terminal. When the unicast stream catches a multicast stream, that is, at a time point 3, the server starts to slowly push the unicast stream and sends a multicast packet synchronizing message to the terminal.

Time between the time point 2 and the time point 3 is time T1 for fast pushing the unicast stream by the server. In this embodiment, it is set that a time point that the server starts to slowly push the unicast packet is a time point that the server sends the multicast packet synchronizing message.

303: The terminal receives the synchronizing message, and sends a multicast join request at a time point 4.

The terminal sends the multicast join message to a corresponding multicast replication point, so that the multicast join delay is affected by factors such as a level of the multicast replication point, a link state, an access condition, and a client condition. Taking the level of the multicast replication point as an example, for a deployed network, the level of the multicast replication point is fixed, each level of the multicast replication point has a fixed multicast join delay, if data of a channel that a user requests to join arrives at a nearest multicast replication point, it is not necessary to request channel data from a upper level multicast replication point, and the multicast join delay is relatively short; if the nearest multicast replication point does not have the channel data requested by the user, it is necessary to request the channel data from the upper level or a further upper level multicast replication point, and the multicast join delay is relatively long.

A data amount buffered by the terminal at a time point 4 is V1 that is, a data amount buffered by the terminal when the fast unicast stream catches the multicast.

304: The terminal receives an FMP at a time point 5.

Time between the time point 3 and the time point 5 is a time interval T2 between time when the server starts to slowly push the unicast packet and time when the terminal receives the FMP, and time between the time point 4 and the time point 5 is a multicast join delay T3.

A data amount buffered by the terminal at the time point 5 is V2, that is, a buffered data amount when the terminal receives the FMP.

305: The terminal returns a synchronizing message response carrying an FMP identifier to the server.

306: After receiving the synchronizing message response, the server stops slowly pushing the unicast stream at a time point 6.

Time between the time point 3 and the time point 6 is a time interval T4 of slowly pushing the unicast stream.

In this embodiment, it is set that a video average rate (original rate) is X Mbps, a decoding rate is nX Mbps, n is a decoding multiplying power, usually n=1, a fast unicast push rate is aX, a is a fast pushing multiplying power, currently a is usually 1.3, a slowly unicast push rate is bX, b is a slowly pushing multiplying power, currently b is usually 0.3, usually a maximum data amount that a VBV of the terminal can buffer is B=7995392 bits=0.95 Mbytes, a lowest buffer data amount required for decoding of the terminal is cB, c is a buffer coefficient, currently it is usually regulated that c=½, and when the data amount buffered by the VBV is lower than cB, decoding cannot be started. When it is estimated in another manner that the terminal has another value, for example, when it is determined in a simplified manner that the buffer of the terminal is totally cleared, the terminal cannot perform the decoding. Vi is the data amount between the starting position of the fast unicast stream and the latest packet position, and $Vi_{(min)}$ is a minimum value of the data amount between the starting position of the fast unicast stream and the latest packet position.

At the time point 3, the data amount of unicast pushing is Vi more than the data amount of multicast pushing, a sum of the increased data amount and the data amount bXT3 received before the terminal receives the FMP is greater than the data amount nXT3 decoded by the terminal at the time T3, that is, Vi−cB+bXT3>=nXT3 and Vi>=(nX−bX)×T3+cB. Therefore, in order to prevent degradation of image quality, the minimum value of Vi is $Vi_{(min)}$=(nX−bX)×T3+cB.

It may be understood by persons of ordinary skill in the art that according to the principle, for other unicast pushing manners, for example, the manner that after the time point 3, the unicast is still fast pushed until the multicast replication point sends the multicast stream, or after the time point 3 the unicast is still fast pushed for certain time and then the unicast is slowly pushed, the corresponding minimum value of the data amount between the starting position of the fast unicast stream and the latest packet position may also be obtained. For example, for the manner that after the time point 3, the unicast is still fast pushed until the multicast replication point sends the multicast stream, Vi>=(nX−aX)×T3+cB. aX is the unicast push rate, and specifically under the situation that when the unicast stream catches the multicast stream, the server still fast pushes the unicast until the multicast replication point sends the multicast stream, a is the fast pushing multiplying power, that is, a>1. Here, the main reason for the degradation of the image quality is that the buffered data amount required for the decoding is large. Similarly, for the manner that after the time point 3, the unicast is still fast pushed for certain time and then the unicast is slowly pushed, it may be obtained that $Vi_{(min)}$=(nX−sX)×T3+cB, where b<s<a.

203: The server judges whether the latest I frame completely arrives according to a packet buffer state.

Figure 5:
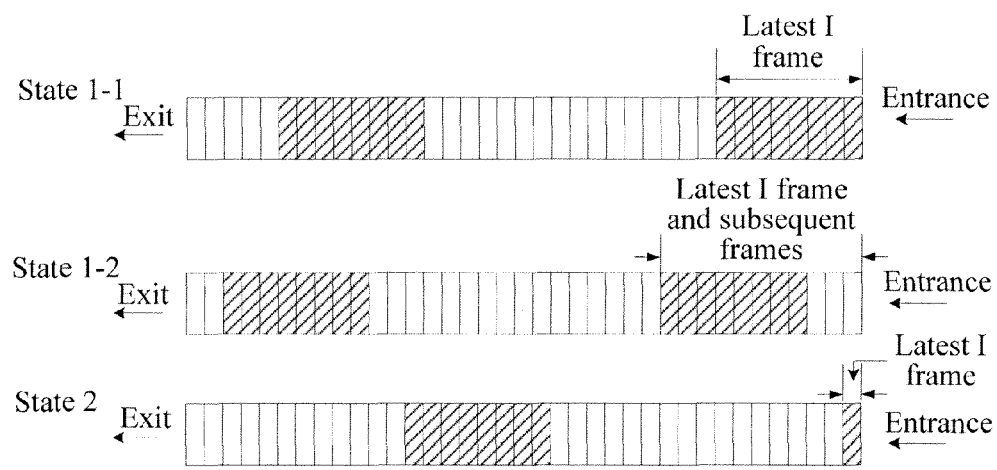
FIG. 5 is a schematic diagram of a packet buffer state according to a second embodiment of the present invention.

Referring to a schematic diagram of a packet buffer state of the server as shown in FIG. 5, the dashed line part represents a latest I frame, the packet buffer state of the server is approximately divided into two states, one is that the latest I frame completely arrives (state 1), and the other is that the latest I frame does not completely arrive (state 2). The state that the latest I frame completely arrives may be further defined, that is, the data amount arrived starting from the latest I frame is formed by the latest I frame (state 1-1), or is formed by the latest I frame and subsequent frames (state 1-2).

204: The server fast pushes the unicast stream starting from the corresponding I frame according to whether the latest I frame completely arrives.

Specifically, if the latest I frame completely arrives, and the data amount arrived starting from the latest I frame is greater than or equal to the minimum value $Vi_{(min)}$, the unicast stream is fast pushed from the latest I frame.

If the latest I frame completely arrives, and the data amount arrived starting from the latest I frame is smaller than the minimum value, the unicast stream is fast pushed starting from a previous I frame of the latest I frame, where the previous I frame of the latest I frame may be a previous I frame of the latest I frame or an earlier I frame. In addition, in order to prevent the multicast join delay from being long, the data amount in the buffer may underflow, so that the decoder does not have enough data for decoding, which results in a pause or blurred screen phenomenon of the played images.

Before the unicast stream is fast pushed from the previous I frame of the latest I frame, it is judged whether the data amount arrived starting from the previous I frame of the latest I frame satisfies the condition of being greater than or equal to the minimum value $Vi_{(min)}$, and if the data amount satisfies the condition, the unicast stream is fast pushed from the previous I frame of the latest I frame, and if the data amount does not satisfy the condition, the unicast stream is fast pushed from the I frame earlier than the latest I frame satisfying the condition.

If the latest I frame does not completely arrive, the unicast stream is fast pushed from the previous I frame of the latest I frame, where the previous I frame of the latest I frame may be a previous I frame of the latest I frame or an earlier I frame. In addition, in order to prevent the multicast join delay from being long, the data amount in the buffer may underflow, so that the decoder does not have enough data for decoding, which results in a pause or blurred screen phenomenon of the played images. Before the unicast stream is fast pushed from the previous I frame of the latest I frame, it is judged whether the data amount arrived starting from the previous I frame of the latest I frame satisfies the condition of being greater than or equal to the minimum value $Vi_{(min)}$, and if the data amount satisfies the condition, the unicast stream is fast pushed from the previous I frame of the latest I frame, and if the data amount does not satisfy the condition, the unicast stream is fast pushed from the I frame earlier than the latest I frame satisfying the condition.

The previous I frame of the latest I frame may be a previous I frame of the latest I frame or an earlier I frame.

In this embodiment, the minimum value of the data amount between the starting position of the fast unicast stream and the latest packet position is determined according to the multicast join delay of the terminal, the decoding rate, the unicast push rate, and the lowest buffer data amount required for decoding; the unicast stream is fast pushed starting from the latest I frame if the latest I frame completely arrives, and the arrived data amount from the latest I frame is greater than or equal to the minimum value. Compared with fixedly fast pushing the unicast stream from the previous I frame of the latest I frame, burst traffic is reduced, and meanwhile it is ensured that the terminal buffer is prevented from underflow due to a long multicast join delay, thus reducing a bandwidth requirement and synchronization processing time for channel content while ensuring quality of images played by the terminal.

Embodiment 3

Figure 6:
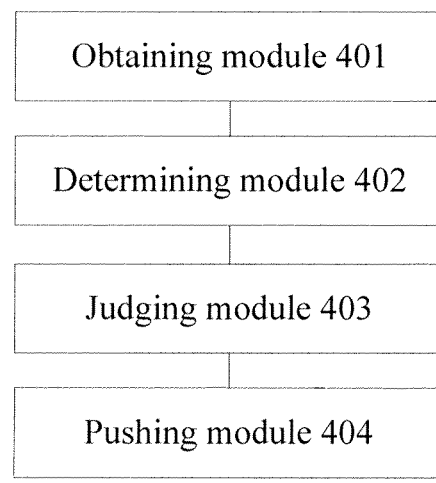
FIG. 6 is a schematic structural diagram of a device for fast pushing a unicast stream in an FCC according to a third embodiment of the present invention.

Referring to FIG. 6, this embodiment provides a device for fast pushing a unicast stream in an FCC, where the device includes:

An obtaining module 401 is configured to obtain a multicast join delay of a terminal.

A determining module 402 is configured to determine a minimum value of a data amount between a starting position of a fast unicast stream and a latest packet position according to the multicast join delay of the terminal, a decoding rate, a unicast push rate, and a lowest buffer data amount required for decoding.

A judging module 403 is configured to judge whether a latest I frame completely arrives according to a packet buffer state.

Referring to a schematic diagram of a packet buffer state of a server as shown in FIG. 5, the dashed line part represents a latest I frame, the packet buffer state of the server is approximately divided into two states, one is that the latest I frame completely arrives (state 1), and the other is that the latest I frame does not completely arrive (state 2). The state that the latest I frame completely arrives may be further defined, that is, the data amount arrived starting from the latest frame is formed by the latest I frame (state 1-1), or is formed by the latest I frame and subsequent frames (state 1-2).

A pushing module 404 is configured to fast push the unicast stream starting from the latest I frame if the latest I frame completely arrives, and an arrived data amount from the latest I frame is greater than or equal to the minimum value.

The obtaining module 401 is configured to receive an RTCP XR extension message sent by the terminal, where the RTCP XR extension message carries relevant information of the multicast join delay of the terminal, and the relevant information includes:

a multicast join delay, where the multicast join delay is a time interval between time for sending a multicast join message by the terminal and time for receiving an FMP by the terminal; or the time for sending the multicast join message by the terminal and the time for receiving the FMP by the terminal; or the multicast join delay, the time for sending the multicast join message by the terminal, and the time for receiving the FMP by the terminal.

FIG. 3 shows an example of an RTCP XR extension message, where an extended field includes: an IGMP Join Delay, that is, the multicast join delay; or extended fields include: time of send igmp join and time of first multicast burst, that is, the time for sending the multicast join message by the terminal and the time for receiving the FMP by the terminal. Alternatively, extended fields may also include the foregoing three extended fields.

The determining module 402 is specifically configured to determine the minimum value of the data amount between the starting position of the fast unicast stream and the latest packet position according to $Vi_{(min)}=(nX-sX)\times T3+cB$, where $Vi_{(min)}$ is the minimum value of the data amount between the starting position of the fast unicast stream and the latest packet position, nX is the decoding rate, n is a decoding multiplying power, and X is a video average rate, sX is the unicast push rate, and s is a pushing multiplying power, T3 is the multicast join delay of the terminal, cB is the lowest buffer data amount required for decoding of the terminal, c is a buffer coefficient, and B is a maximum data amount that a VBV can buffer.

Based on a diagram of an information interaction of an FCC shown in FIG. 4, in this embodiment, it is set that a video average rate (original rate) is X Mbps, a decoding rate is nX Mbps, n is a decoding multiplying power, usually n=1, a fast unicast push rate is aX, a is a fast pushing multiplying power, currently a is usually 1.3, a slowly unicast push rate is bX, b is a slowly pushing multiplying power, currently b is usually 0.3, usually a maximum data amount that the VBV of the terminal can buffer is B=7995392 bits=0.95 Mbytes, a lowest buffer data amount required for decoding of the terminal is cB, c is a buffer coefficient, currently it is usually regulated that c=½, and when the data amount buffered by the VBV is lower than cB, decoding cannot be started. When it is estimated in another manners that the terminal has another value, for example, when it is determined in a simplified manner that the buffer of the terminal is totally cleared, the terminal cannot perform the decoding. Vi is the data amount between the starting position of the fast unicast stream and the latest packet position, and $Vi_{(min)}$ is a minimum value of the data amount between the starting position of the fast unicast stream and the latest packet position.

At the time point 3, the data amount of unicast pushing is Vi more than the data amount of multicast pushing, a sum of the increased data amount and the data amount bXT3 received before the terminal receives the FMP is greater than the data amount nXT3 decoded by the terminal at time T3, that is, Vi−cB+bXT3>=nXT3 and Vi>=(nX−bX)×T3+cB. Therefore, in order to prevent degradation of image quality, the minimum value of Vi is $Vi_{(min)}=(nX-bX)\times T3+cB$.

It may be understood by persons of ordinary skill in the art that according to the principle, for other unicast pushing manners, for example, the manner that after the time point 3, the unicast is still fast pushed until the multicast replication point sends the multicast stream, or after the time point 3, the unicast is still fast pushed for certain time and then the unicast is slowly pushed, the corresponding minimum value of the data amount between the starting position of the fast unicast stream and the latest packet position may also be obtained. For example, for the manner that after the time point 3, the unicast is still fast pushed until the multicast replication point sends the multicast stream, Vi>=(nX−aX)×T3+cB. aX is the unicast push rate, and specifically under the situation that when the unicast stream catches the multicast stream, the server still fast pushes the unicast until the multicast replication point sends the multicast stream, a is the fast pushing multiplying power, that is, a>1. Here, the main reason for the degradation of image quality is that the buffered data amount required for the decoding is large. Similarly, for the manner that after the time point 3, the unicast is still fast pushed for certain time and then the unicast is slowly pushed, it may be obtained that $Vi_{(min)}=(nX-sX)\times T3+cB$, where b<s<a.

Further, the pushing module 404 is configured to fast push the unicast stream starting from a previous I frame of the latest I frame if the latest I frame completely arrives, and the arrived data amount from the latest I frame is smaller than the minimum value, where the previous I frame of the latest I frame may be a previous I frame of the latest I frame or an earlier I frame. In addition, in order to prevent the multicast join delay from being long, the data amount in the buffer may underflow, so that a decoder does not have enough data for decoding, which results in a pause or blurred screen phenomenon of the played images. Before the unicast stream is fast pushed starting from the previous I frame of the latest I frame, it is judged whether the data amount arrived starting from the previous I frame of the latest I frame satisfies the condition of being greater than or equal to the minimum value $Vi_{(min)}$, and if the data amount satisfies the condition, the unicast stream is fast pushed from the previous I frame of the latest I frame, and if the data amount does not satisfy the condition, the unicast stream is fast pushed starting from the I frame earlier than the latest I frame satisfying the condition.

Further, the pushing module 404 is configured to fast push the unicast stream from the previous I frame of the latest I frame if the latest I frame does not completely arrive, where the previous I frame of the latest I frame may be a previous I frame of the latest I frame or an earlier I frame. In addition, in order to prevent the multicast join delay from being long, the data amount in the buffer may underflow, so that the decoder does not have enough data for decoding, which results in the pause or blurred screen phenomenon of the played images. Before the unicast stream is fast pushed from the previous I frame of the latest I frame, it is judged whether the data amount arrived starting from the previous I frame of the latest I frame satisfies the condition of being greater than or equal to the minimum value $Vi_{(min)}$, and if the data amount satisfies the condition, the unicast stream is fast pushed from the previous I frame of the latest I frame, and if the data amount does not satisfy the condition, the unicast stream is fast pushed from the I frame earlier than the latest I frame satisfying the condition.

The device provided in this embodiment and the server in the method embodiment belong to the same concept, and for the specific implementing process, refer to the method embodiment, which is not repeatedly described here.

In this embodiment, the minimum value of the data amount between the starting position of the fast unicast stream and the latest packet position is determined according to the multicast join delay of the terminal, the decoding rate, the unicast push rate, and the lowest buffer data amount required for decoding; the unicast stream is fast pushed starting from the latest I frame if the latest I frame completely arrives, and the arrived data amount from the latest I frame is greater than or equal to the minimum value. Compared with fixedly fast pushing the unicast stream starting from the previous I frame of the latest I frame, burst traffic is reduced, and meanwhile it is ensured that the terminal buffer is prevented from underflow due to a long multicast join delay, thus reducing a bandwidth requirement and synchronization processing time for channel content while ensuring quality of images played by the terminal.

All or part of the content in the technical solutions provided by the embodiments may be implemented by software programming, and the software program may be stored in a readable storage medium, for example, a hard disk, an optical disk, or a floppy disk in a computer.

The foregoing descriptions are merely some specific exemplary embodiments of the present invention, however, are not intended to limit the protection scope of the present invention. Various modifications and variations that may be easily occurred to persons skilled in the art in the technical scope disclosed in the present invention shall fall within the protection scope of the present invention. Therefore, the protection scope of the present invention is subject to the protection scope of the claims.

What is claimed is:

1. A method for fast sending a unicast stream in a fast channel change (FCC), comprising:
   obtaining a multicast join delay of a terminal, wherein the multicast join delay is a time interval starting from sending a multicast join message by the terminal until start receiving a first multicast packet (FMP) by the terminal;
   determining a minimum value of a data buffer amount on a server when the server has received an FCC request to transmit a unicast stream which is to be sent at a rate faster than a video average rate, wherein the determining is according to: the multicast join delay of the terminal, a decoding rate for decoding the unicast stream by the terminal, a unicast sending rate by the server, and a lowest buffer data amount on the terminal required for the decoding of the unicast stream on the terminal;
   judging whether a latest I frame has completely arrived according to a packet buffer state; and
   sending the unicast stream at the rate faster than the video average rate starting from the latest I frame if the latest I frame has completely arrived, wherein an arrived data amount starting from the latest I frame is greater than or equal to the minimum value;
   wherein the determining of the minimum value of the data buffer amount comprises:
      determining the minimum value of the data buffer amount according to $Vi_{(min)}=(nX-sX)\times T3+cB$;

wherein $Vi_{(min)}$ is the minimum value of the data buffer amount, nX is the decoding rate, n is a decoding multiplying power, and X is the video average rate, sX is the unicast sending rate, and s is a sending multiplying power, T3 is the multicast join delay of the terminal, cB is the lowest buffer data amount on the terminal required for the decoding of the unicast stream on the terminal, c is a buffer coefficient, and B is a maximum data amount that a Video Buffering Verifier (VBV) can buffer.

2. The method according to claim 1, wherein the obtaining of the multicast join delay of the terminal comprises:

receiving a Real-time Transport Control Protocol (RTCP) Extended Report (XR) extension message sent by the terminal, wherein the RTCP XR extension message carries relevant information of the multicast join delay of the terminal, and the relevant information comprises:

the multicast join delay;

the time for sending the multicast join message by the terminal and the time for receiving the FMP by the terminal; or the multicast join delay, the time for sending the multicast join message by the terminal, and the time for receiving the FMP by the terminal.

3. The method according to claim 2, wherein after the judging of whether the latest I frame has completely arrived according to the packet buffer state, the method further comprises:

sending the unicast stream at the rate faster than the video average rate starting from a previous I frame of the latest I frame if the latest I frame has completely arrived, wherein an arrived data amount starting from the latest I frame is smaller than the minimum value.

4. The method according to claim 2, wherein after the judging of whether the latest I frame has completely arrived according to the packet buffer state, the method further comprises:

sending the unicast stream at the rate faster than the video average rate starting from a previous I frame of the latest I frame if the latest I frame has not completely arrived.

5. The method according to claim 1, wherein after the judging of whether the latest I frame has completely arrived according to the packet buffer state, the method further comprises:

sending the unicast stream at the rate faster than the video average rate starting from a previous I frame of the latest I frame if the latest I frame has completely arrived, and wherein an arrived data amount starting from the latest I frame is smaller than the minimum value.

6. The method according to claim 1, wherein after the judging of whether the latest I frame has completely arrived according to the packet buffer state, the method further comprises:

sending the unicast stream at the rate faster than the video average rate starting from a previous I frame of the latest I frame if the latest I frame has not completely arrived.

7. The method according to claim 1, wherein after the judging of whether the latest I frame has completely arrived according to the packet buffer state, the method further comprises:

sending the unicast stream at the rate faster than the video average rate starting from a previous I frame of the latest I frame if the latest I frame has completely arrived, wherein an arrived data amount starting from the latest I frame is smaller than the minimum value.

8. The method according to claim 1, wherein after the judging of whether the latest I frame has completely arrived according to the packet buffer state, the method further comprises:

sending the unicast stream at the rate faster than the video average rate starting from a previous I frame of the latest I frame if the latest I frame has not completely arrived.

9. A device for fast sending a unicast stream in a fast channel change (FCC), comprising:

an obtaining module, configured to obtain a multicast join delay of a terminal; wherein the multicast join delay is a time interval starting from sending a multicast join message by the terminal until start receiving a first multicast packet (FMP) by the terminal;

a determining module, configured to determine a minimum value of a data buffer amount on a server when the server has received an FCC request to transmit a unicast stream which is to be sent at a rate faster than a video average rate wherein the determining is according to: the multicast join delay of the terminal, a decoding rate for decoding the unicast stream by the terminal, a unicast sending rate by the server, and a lowest buffer data amount on the terminal required for the decoding of the unicast stream on the terminal;

a judging module, configured to judge whether a latest I frame has completely arrived according to a packet buffer state; and a sending module, configured to send the unicast stream at the rate faster than the video average rate starting from the latest I frame if the latest I frame has completely arrived, wherein an arrived data amount starting from the latest I frame is greater than or equal to the minimum value;

wherein the determining module is configured to determine the minimum value of the data buffer amount according to $Vi_{(min)}=(nX-sX) \times T3+cB$;

wherein $Vi_{(min)}$ is the minimum value of the data buffer amount, nX is the decoding rate, n is a decoding multiplying power, and X is the video average rate, sX is the unicast sending rate, and s is a sending multiplying power, T3 is the multicast join delay of the terminal, cB is the lowest buffer data amount on the terminal required for the decoding of the unicast stream on the terminal, c is a buffer coefficient, and B is a maximum data amount that a Video Buffering Verifier (VBV) can buffer.

10. The device according to claim 9, wherein the obtaining module is configured to receive a Real-time Transport Control Protocol (RTCP) Extended Report (XR) extension message sent by the terminal, wherein the RTCP XR extension message carries relevant information of the multicast join delay of the terminal, and the relevant information comprises one of:

the multicast join delay;

the time for sending the multicast join message by the terminal and the time for receiving the FMP by the terminal; or the multicast join delay, the time for sending the multicast join message by the terminal, and the time for receiving the FMP by the terminal.

11. The device according to claim 10, wherein the pushing module is further configured to:

send the unicast stream at the rate faster than the video average rate starting from a previous I frame of the latest I frame if the latest I frame has completely arrived, wherein an arrived data amount starting from the latest I frame is smaller than the minimum value.

12. The device according to claim 10, wherein the pushing module is further configured to:
send the unicast stream at the rate faster than the video average rate starting from a previous I frame of the latest I frame if the latest I frame has not arrived.

13. The device according to claim 9, wherein the pushing module is further configured to:
send the unicast stream at the rate faster than the video average rate starting from a previous I frame of the latest I frame if the latest I frame has completely arrived, wherein an arrived data amount starting from the latest I frame is smaller than the minimum value.

14. The device according to claim 9, wherein the pushing module is further configured to:
send the unicast stream at the rate faster than the video average rate starting from a previous I frame of the latest I frame if the latest I frame has not completely arrived.

15. The device according to claim 9, wherein the pushing module is further configured to:
send the unicast stream at the rate faster than the video average rate starting from a previous I frame of the latest I frame if the latest I frame arrives completely, and an arrived data amount starting from the latest I frame is smaller than the minimum value.

16. The device according to claim 9, wherein the pushing module is further configured to:
send the unicast stream at rate the faster than the video average rate starting from a previous I frame of the latest I frame if the latest I frame has not completely arrived.

\* \* \* \* \*